United States Patent [19]

Wilkinson et al.

[11] Patent Number: 5,342,893
[45] Date of Patent: Aug. 30, 1994

[54] ANTIPOPPING AGENTS FOR POWDER COATING COMPOSITIONS

[75] Inventors: Roy R. Wilkinson, Wellingborough; Anthony Phillips, Thrapston, both of Great Britain

[73] Assignee: Scott Bader Company Limited, Wellingborough, England

[21] Appl. No.: 29,657

[22] Filed: Mar. 10, 1993

[30] Foreign Application Priority Data

Mar. 10, 1992 [GB] United Kingdom ............... 9205137

[51] Int. Cl.$^5$ .............................................. C08L 67/02
[52] U.S. Cl. ..................................... 525/176; 525/177
[58] Field of Search ............................... 525/176, 177

[56] References Cited

U.S. PATENT DOCUMENTS

| | | | |
|---|---|---|---|
| 4,286,021 | 8/1981 | Brendley, Jr. | 428/413 |
| 4,499,239 | 2/1985 | Murakami et al. | 525/111 |
| 4,727,111 | 2/1988 | Pettit | 525/190 |
| 4,788,255 | 11/1988 | Pettit | 525/174 |
| 4,801,680 | 1/1989 | Geary | 528/272 |
| 4,937,288 | 1/1990 | Pettit | 525/176 |
| 5,098,955 | 3/1992 | Pettit | 525/194 |
| 5,182,337 | 1/1993 | Pettit | 525/176 |

FOREIGN PATENT DOCUMENTS

| | | |
|---|---|---|
| 0322834 | 7/1989 | European Pat. Off. . |
| 0471409 | 2/1992 | European Pat. Off. . |
| 0516375 | 12/1992 | European Pat. Off. ... C09D 167/00 |
| 0517535 | 12/1992 | European Pat. Off. . |
| 0522648 | 1/1993 | European Pat. Off. . |
| WO92/0148 | 2/1992 | PCT Int'l Appl. . |
| 1518004 | 7/1978 | United Kingdom . |

*Primary Examiner*—James J. Seidleck
*Assistant Examiner*—I. Zemel
*Attorney, Agent, or Firm*—Cushman, Darby & Cushman

[57] ABSTRACT

A thermosetting powder coating composition containing a solid saturated thermosetting polyester having an acid value of at least 25 and a glass transition temperature (Tg) of at least 45° C. and a curing agent such as a hydroxyalkyl amide capable of reacting with carboxylic acid groups of the polyester additionally contains, as an anti-popping agent, a thermoplastic polymer which i) is solid, ii) has a Tg of 30°–100° C., iii) comprises, at least mainly, units derived from at least one alkyl acrylate or alkacrylate and iv) has an acid value of no more than 10.

11 Claims, No Drawings

ANTIPOPPING AGENTS FOR POWDER COATING COMPOSITIONS

FIELD OF THE INVENTION

This invention relates to thermosetting resin based powder coating compositions, which after application to a substrate can be melted, fused and cured by heat to form a hard resilient film.

BACKGROUND OF THE INVENTION

As a means of surface coating, powder technology offers significant advantages. Normally a single application is sufficient to form the final coating, waste or excess powder can be recycled, and the total application weight is less than with liquid systems where a significant proportion of the composition is volatilised in the cure process creating the risk of environmental contamination.

Acid functional polyester based powder coatings cured with diglycidyl ether bisphenol A type materials have poor weather resistance. Exterior grade coatings may be made from hydroxy-terminated polyester which is cured with (expensive) blocked isocyanate, but the preferred method has been to use a carboxy-functional polyester cured by a cycloaliphatic epoxy resin. Of the cycloaliphatic epoxies, triglycidyl isocyanurate (TGIC) is the most commonly used, but it is both an irritant and toxic.

More recently Rohm and Haas have developed the less toxic hydroxy alkylamide (HAA) range of curing agents for use with carboxy-terminated polyesters. Polycondensation reactions between the hydroxyl groups of the HAA and the carboxylic groups of the polyester at temperatures of 140°–200° C. produce the cured film, at the same time splitting off water.

If water vapour is unable to escape freely, popping occurs which leaves the film surface pin holed and cratered. It is known to employ a so-called "antipopping" or "degassing" agent. It is believed that such agents have a surface tension effect to "hold the film open" during cure to allow the vapour to escape. It is added typically in amounts of between 5 and 50 parts by weight as a component of a 1000 part powder coating formulation hereinafter referred to as a "paint". As illustrated in EP-A-0516375, published after the priority date of this application, benzoin is conventionally used for this purpose. However, benzoin with either heat or ageing tends to cause a degree of yellowing in the paint film.

Thus, although HAAs present an advance in polyester powder coating crosslinking technology and benzoin is an answer to popping, the combination of these two materials in the same formulation leads to a new problem. At cure temperature, the compounds at least partially react to form coloured compounds which cause a darkening of the paint. This is sufficiently noticeable to prevent the attainment of a true brilliant white coating. The problem also creates difficulties in formulating pale or pastel shades.

SUMMARY OF THE INVENTION

The present invention has identified a range of solid thermoplastic polymers that function as anti-popping agents. They can be used as direct replacements for benzoin, when formulated with HAAs, without causing discolouration. Hence true brilliant white, polyester based, HAA cured powder coatings are at last made possible.

Incidentally, direct benzoin replacement, as an antipopping agent, by such a solid thermoplastic polymer may also be made in powder coating formulations which do not contain the HAA curing agent. Differences in colour are noted with curing agents other than HAA, but for such curing agents discolouration is not such a significant problem. However other benefits may be thought useful. The replacement of a low molecular weight, water extractable, compound (benzoin) by a much higher molecular weight water insoluble polymer will certainly improve the durability of the powder paint coatings in terms of weathering; at least marginal improvements may also be expected in terms of toughness and flexibility.

The present invention provides a thermosetting powder coating composition comprising:

a) a solid saturated polyester having an acid value of at least 25 and a glass transition temperature (Tg) of at least 45° C.;

b) a curing agent capable of reaction with carboxylic acid groups of the saturated polyester (a) and preferably comprising a hydroxyalkyl amide (HAA); and c) a thermoplastic polymer which
   i) is solid;
   ii) has a Tg of from 30° C. to 100° C. inclusive;
   iii) comprises, at least mainly, units derived from at least one alkyl acrylate or alkacrylate; and
   iv) has an acid value of no more than 10, preferably no more than 5.

According to another aspect, the invention provides a thermosetting powder coating composition containing a solid saturated polyester having carboxylic acid groups and curable by a curing agent capable of reacting with the carboxylic acid groups, and containing an antipopping agent, the improvement comprising the use, as the antipopping agent of the above thermoplastic polymer (c).

DESCRIPTION OF PREFERRED EMBODIMENTS

The polyester [a] may be any such thermosetting polyester having free carboxylic groups capable of a crosslinking reaction with the curing agent.

The solid saturated polyester is one which is free from ethylenic (alkene) or acetylenic (alkyne) unsaturation. It can be made by reacting one or more polyols, especially glycols, with one or more saturated poly, especially, di, carboxylic acids, the dimethyl esters thereof or their anhydrides. In an alternative reaction by which the saturated polyester can be made, one or more (typically two) glycols are reacted with one or more (typically two) saturated dicarboxylic acids or reactive derivatives thereof such as their dimethyl ester(s) or their anhydride(s). The required acid value of at least 25 may be obtained either by adjusting the relative proportions of polycarboxylic acid and polyol components or, for example, preparing a hydroxyl-terminated prepolymer and reacting this with a polycarboxylic acid.

Typically, the polyol component is derived from at least one of ethylene glycol, propylene glycol, 1,4-butanediol, 1,6-hexanediol, neopentyl glycol, diethylene glycol, 1,4-cyclohexanedimethanol and trimethylolpropane.

Typically, the acid component is derived from at least one of adipic acid, succinic acid, azelaic acid, sebacic acid, trimellitic acid, terephthalic acid, isophthalic acid and reactive derivatives thereof.

Preferably at least one of the acid and glycol components is derived from two acids or glycols respectively.

The curing agent may be an epoxy resin, for example, a cycloaliphatic epoxy resin such as triglycidyl isocyanurate. However, as mentioned above, particular benefits of the invention are realised when the curing agent comprises a hydroxyalkyl amide (HAA) but a brilliant white coating (previously unattainable with such coatings when an antipopping agent was also present) is desired.

A β-hydroxyalkyl amide curing agent which may be used has the formula

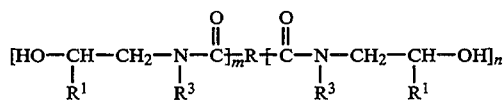

wherein $R_1$ is H or $C_{1-5}$ alkyl
$R_3$ is H, $C_{1-5}$ alkyl or HO—CH—CH$_2$—
                                        |
                                       $R^1$ R is a bond, or a mono- or polyvalent organic radical derived from a saturated, unsaturated or aromatic hydrocarbon which is optionally substituted and contains 2-20 carbon atoms, for example an alkylene radical $-(CH_2)_x-$ where x is 2-12, e.g. 4-10, m is 1 or 2 n is 0 or 2 and m+n is at least 2, e.g. 2-4.

Such a curing agent (b) is available commercially as Primid ™ XL-552 (Rohm and Haas) which, according to the manufacturers, has the formula:

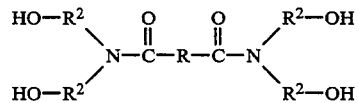

where R is as defined above and $R^2$ is —$CH_2$—$CHR^1$—, where $R^1$ is as defined above.

Preferably, the respective amounts of HAA curing agent (b) and solid saturated polyester (a) should be such as to provide a hydroxy equivalent of the HAA (b) to a carboxyl equivalent of the polyester (a) of about 0.6:1 to 1.6:1, especially 0.8:1 to 1.3:1.

The solid thermoplastic polymer (c), present as antipopping agent, has a glass transition temperature (Tg) of from 30° C. to 100° C., preferably within the range 30° to 70° C. inclusive, more preferably within the range 35° to 60° C. inclusive. It should have a low or medium molecular weight and have a degree of compatibility, preferably a partial compatibility, with molten polyester powder coating resins when above its Tg.

Thus, preferred respective ranges of molecular weights are:

Number average molecular weight 1,000 to 10,000, more preferably 2,000 to 8,000

Weight average molecular weight 1,000 to 20,000, more preferably 2,000 to 20,000, especially 3,000 to 15,000

Peak molecular weight 500 to 1 million, more preferably 1,000 to 500,000, especially 3,000 to 130,000.

It has an acid value of no more than 10 so that it does not undergo any significant reaction with the hydroxyl groups on either or both of the solid saturated polyester (a) or curing agent (b). It is believed also that the absence of a significant number of carboxyl groups from the solid thermoplastic polymer will provide a certain degree of incompatibility between the solid saturated polyester (a) and the solid thermoplastic polymer (c) which is thought may be necessary.

The polymer should be active as an anti-popping agent at the cure temperature of the powder coating composition which may be within the range of 140°-220° C., preferably within the range 140°-200° C.

Suitable thermoplastic polymers have been found to be acrylate polymers such as homo and copolymers of alkyl, preferably $C_{1-4}$ alkyl, acrylates, or alkacrylates, preferably ($C_{1-2}$ alk) acrylates, especially methacrylates, mixtures thereof and copolymers of any of these with styrene, especially styrene/(meth)acrylate copolymers. A copolymer preferably contains at least 80% of the alkyl acrylate or alkacrylate.

The thermoplastic polymer is preferably present in an amount of at least 1%, more preferably 2-6%, especially 2.5-5%, by weight of the total weight of the composition.

According to another aspect, the invention provides a method of preparing the above thermosetting powder coating composition comprising components (a), (b) and (c), which method comprises maintaining the solid saturated polyester (a) at a temperature above its melting point, blending into the polyester the thermoplastic polymer (c), allowing the mixture to cool, granulating the resulting solid, adding the curing agent (b) and optionally any other additive, extruding the resultant composition through an extruder and grinding the resultant mass to form the said powder coating composition. Such blending of the antipopping agent and the polyester may be carried out by the resin manufacturer in the reactor prior to running out the hot molten completed polyester base resin. If the thermoplastic polymer is added and stirred into the resin at or above 180° C. it will form an intimate blend with the polyester. When the composition has been cooled and granulated, the paint manufacturer may then blend in the curing agent and any other ingredient such as pigment, filler etc. by extrusion.

According to an alternative method in accordance with the invention for preparing the above thermosetting powder coating composition comprising components (a), (b) and (c), each of components (a), (b) and (c) is merely admixed, together with any other additive optionally present, to form a mixture which is extruded at normal powder coating temperatures usually at a minimum temperature of 50° C., preferably at a temperature of at least 80° C., to form a mass, which is allowed to cool and then ground into a powder. Such blending of the solid thermoplastic polymer with the polyester may be carried out by the paint manufacturer, in which case the full powder paint formulation is mixed and extruded. When passing the composition through the extruder at typically 100°-120° C., the polymer of Tg≦100° C. will be sufficiently dispersed or miscible to be effective with the polyester.

In addition to its serving as an anti-popping agent, the solid thermoplastic polymer may additionally improve other properties of the coating composition such as the flexibility of powder coating films produced from it.

Flow modifiers or flow control agents, especially polymeric flow control agents, may also be added to polyester powder coating formulations. These may be polymers of low molecular weight and may even be acrylic in nature. However they are all liquids or semi-liquids at ambient temperature (Tg≦30° C.), although sometimes they may give the appearance of powders when they are absorbed into silica particles for ease of handling. Such polymers function so as to prevent the formation of "orange peel", ripples or waves on the paint surface during cure, but they do not alleviate popping even when added in excess of normal levels. They are present in amounts ≦1% by weight of the total weight of the paint composition.

The powder coating composition may be coated onto a substrate by any of the conventional methods, for example spraying, and thereafter melted, fused and cured by heat to form a hard resilient film of a thickness which is preferably 50–250 μm, more preferably 60–100 μm, especially 60–80 μm.

Embodiments of the invention will now be described in more detail with reference to the following Examples.

EXAMPLE 1

Preparation of Polyester

A polyester was prepared from the following composition so as to provide hydroxyl termination.

|  | pbw |
|---|---|
| Terephthalic acid | 440.3 |
| Adipic acid | 42.1 |
| Neopentyl glycol | 343.7 |
| Trimethylolpropane | 14.1 |
| Dibutyl tin oxide | 2.9 |
| Water | 3.1 |

The hydroxy-terminated polyester was then reacted with the following composition at high temperature to provide a carboxyl-terminated polyester capable of reaction with an HAA curing agent.

|  |  |
|---|---|
| Isophthalic acid | 105.7 |
| Dibutyl tin oxide | 2.4 |

EXAMPLES 2–3

Paint Formulation—Method 1

These Examples describe a first paint formulation method embodying the invention in which the solid thermoplastic polymer (c) is first blended with molten saturated polyester (a) to form a polymer blend, granules of which are thereafter blended into a paint formulation.

EXAMPLE 2—BLENDING OF ANTI-POPPING AGENT

While the carboxyl terminated polyester prepared above was still molten, the following anti-popping agent was blended with it.

| Acronal TM 260F | 19.7 parts. |
|---|---|

Acronal 260F is an acrylic/styrene copolymer commercially available from BASF, in the form of fine white beads. It has a softening point (DIN 53180) of about 120° C., a low acid value (DIN 53402) of ca 2 mg. KOH/g.

The resultant blend, containing both polyester and anti-popping agent, was cooled and granulated. It is referred to below as PPA.

EXAMPLE 3—BLENDING OF FORMULATION

The following blends were then prepared, each containing a polyester, HAA curing agent, pigment, flow modifier and anti-popping agent, namely Acronal TM 260F (Example 3A) or benzoin (Example 3B).

EXAMPLE 3A

|  | pbw |
|---|---|
| PPA of Example 2 (containing Acronal TM 260F) | 950 |
| Primid TM XL-552 | 50 |
| Titanium dioxide | 500 |
| BYK TM 360P | 10 |
| Ultramarine blue | 1 |

Primid TM XL-552 is a commercially available hydroxyalkyl amide with the following characteristics, provided by the manufacturer:

PRIMID TM XL-552
β-Hydroxyalkyl Amide (HAA)

$$HO-CHR_1-CH_2 \diagdown \diagup CH_2-CHR_1-OH$$
$$N-CO-R-CO-N$$
$$HO-CHR_1-CH_2 \diagup \diagdown CH_2-CHR_1-OH$$

| Hydroxy equivalent weight (calc.) | 82-86 |
|---|---|
| Melting point [°C.] (ASTM E-3479-84) | >120 |

BYK TM 360P is a commercially available polymeric flow control agent from BYK-Chemie.

|  | pbw |
|---|---|
| Polyester of Example 1 | 950 |
| Benzoin | 10 |
| Primid TM XL-552 | 50 |
| Titanium dioxide | 500 |
| BYK TM 360P | 10 |
| Ultramarine blue | 1 |

The separate blends of Examples 3A and 3B were extruded at 100°–120° C. then ground to provide powder coating formulations.

EXAMPLE 4

Application of Coating

The above powder coating formulations were applied to respective metal sheets by an electrostatic coating procedure and then cured for 15 minutes in an oven at 180° C.

The colour of the resulting film was measured using a Minolta colour computer according ot ASTM D2244.

|  | Tristimulus values | | |
|---|---|---|---|
| Example | L | a | b |
| 3A | 94.02 | −1.14 | −2.59 |

-continued

| Example | Tristimulus values | | |
|---|---|---|---|
| | L | a | b |
| 3B | 93.63 | −1.45 | −0.54 |

The "b" value gives an indication of yellowness, the more negative the value, the less the apparent yellowness.

Hence it can be seen that an excellent white surface is produced by the coating composition embodying the invention, which is far superior to that obtained when using benzoin as an anti-popping agent.

EXAMPLE 5

Paint Formulation—Method 2

This describes a second paint formulation method embodying the invention in which the solid thermoplastic polymer (c) is initially cold blended with the solid saturated polyester (a).

Nine acrylic polymers were blended in this manner to provide respective paint formulations shown in Table 3 below. In each case, all components of the paint formulation were cold blended in a Z blade mixer for 20 minutes and the resulting blend was then passed through an extruder at a temperature of 100°-120° C. to form a mass which was cooled and then ground to a powder.

The respective acrylic polymers used were all commercially available and details are given in Tables 1 and 2, Table 1 giving details of the acid value, Tg and composition and Table 2 the measured peak, number average and weight average molecular weights. The molecular weights were determined by gel permeation chromatography. All molecular weights are given as polystyrene equivalents.

TABLE 1

| Polymer | Manufacturer | AV | Tg °C. | Description |
|---|---|---|---|---|
| Neocryl TM | | | | |
| B-700 | " | 0 | 62 | iso BMA homopolymer |
| B-722 | " | 6.5 | 37 | MMA/EA copolymer |
| B-725 | " | 6.5 | 63 | n BMA/MMA copolymer |
| B-731 | " | 0 | 57 | iso BMA copolymer |
| B-875 | " | 0 | 54 | iso BMA copolymer |
| Paraloid TM | | | | |
| B-44 | Rohm & Haas | 0.2 | 60 | MMA copolymer |
| B-66 | " | 2.0 | 50 | MMA/n BMA copolymer |
| DM-55 | " | 3.2 | 70 | n/iso(?) BMA copolymer |
| Colacryl TM | | | | |
| TS 1388 | Bonar Copolymers | 0 | 38 | nBMA/MMA copolymer |

BMA Butyl methacrylate
EA Ethyl acrylate
MMA Methyl methacrylate
AV Acid Value

TABLE 2

| Polymer | Molecular Weight | | |
|---|---|---|---|
| | Mp | Mn | Mw |
| Neocryl B-875 | 127000 ± 10% | 71,336 | 141,524 |
| Neocryl B-700 | 114000 ± 10% | 64,742 | 125,068 |
| Colacryl TS1388 | 100000 ± 10% | 53,841 | 100,496 |
| Paraloid B-44 | 84000 ± 10% | 33,070 | 85,531 |
| Neocryl B-722 | 72000 ± 10% | 33,426 | 61,134 |
| Neocryl B-725 | 68000 ± 10% | 29,566 | 53,592 |
| Paraloid B-66 | 66000 ± 10% | 21,459 | 48,079 |
| Neocryl B-731 | 55000 ± 10% | 13,812 | 34,545 |
| Paraloid DM-55 | 3300 ± 10% | 2,302 | 3,434 |

Mp = Peak Molecular Weight
Mn = Number Average Molecular Weight
Mw = Weight Average Molecular Weight Paint formulations were made up with and without flow agent according to the compositions shown in Table 3.

TABLE 3

| | pbw |
|---|---|
| I] No Flow Agent | |
| Resin of Example 1 | 950 |
| Primid XL 552 | 50 |
| Titanium dioxide | 500 |
| Acrylic polymer | 25 |
| Ultramarine blue | 1 |
| II] With Flow Agent | |
| Resin of Example 1 | 950 |
| Primid XL 552 | 50 |
| Titanium dioxide | 500 |
| Acrylic polymer | 25 |
| BYK 360P | 10 |
| Ultramarine blue | 1 |

EXAMPLE 6

Application of Coating

Powder paint was electrostatically coated onto 4 inch by 6 inch Type S ground steel, "Q-Panels", which are standardised substrates for testing coatings, adhesives and mist inhibitors and are made from standard cold rolled steel complying with SAE 1010 (low carbon), ASTM-A-366 and QQS-698.

The type S panels conform to standard D609, Type 2 of A366, are of ¼ hard temper, roughness 15-25 microinches, B60-B70 Rockwell Hardness, tensile strength 54,000 psi and 0.8 mm thick. They have a surface which is abrasive ground, completely removing the mill surface and imparting a smooth surface resembling a "brushed" finish.

The coated panels were cured for 15 minutes at 180° C., the film thickness being approximately 70 microns.

They were then subjected to a visual analysis of colour, pinholing and flow. Further tests were performed:

1] Rhopoint 60 degree gloss reading*
*As measured according to ASTMS C584 (Vol.15.02)

2] Colour measurement using a Minolta colour computer

3] Standard pencil hardness test

| Paint No. | Acrylic Additive @ 2.5% | Flow Agent BYK ™ 360P | 60° gloss | Pencil hardness | Appearance* |
|---|---|---|---|---|---|
| P.860 | Neocryl B-700 | None | 91.4 | — | Good gloss & flow |
| P.861 | Neocryl B-722 | None | 63.9 | — | Poor flow & cissing |
| P.862 | Neocryl B-725 | None | 87.7 | — | Medium, some cissing |
| P.863 | Neocryl B-731 | None | 90.4 | — | Good gloss & flow |
| P.864 | Neocryl B-875 | None | 86.7 | — | Good gloss & flow |
| P.865 | Paraloid B-44 | None | 28.1 | — | Very poor cissing |
| P.866 | Paraloid B-66 | None | 82.3 | — | Medium, some cissing |
| P.867 | Paraloid DM-55 | None | 71.3 | — | Medium, some cissing |
| P.868 | Colacryl TS1388 | None | 87.0 | — | Medium, some cissing |
| P.870 | Neocryl B-700 | Yes | 89.9 | B | Excellent flow, minor popping |
| P.871 | Neocryl B-722 | Yes | 89.7 | HB | Good flow, minor popping |
| P.872 | Neocryl B-725 | Yes | 90.4 | B | Good flow, minor popping |
| P.873 | Neocryl B-731 | Yes | 91.0 | B | Good flow, minor popping |
| B.874 | Neocryl B-875 | Yes | 87.1 | B | Good flow, minor popping |
| B.875 | Paraloid B-44 | Yes | 90.1 | B | Good flow, minor popping |
| B.876 | Paraloid B-66 | Yes | 90.7 | B | Good flow, minor popping |
| B.877 | Paraloid DM-55 | Yes | 91.7 | B | Good flow, minor popping |
| B.878 | Colacryl TS1388 | Yes | 89.4 | B | Good flow, minor popping |

— All paints P.860–878 showed equally excellent whiteness
*For all P.870–878 minor popping visible on film this being to extremely low level of surface popping. Moreover, for paints P860, 863 and 864, where no cissing occurred, it could be seen that only minor popping was visible on the film.
NB. 60° gloss at 90 or over is considered good gloss appearance

| Minolta (1, a, b) Colour Results (see Example A) | | | |
|---|---|---|---|
| | Minolta Colour | | |
| Paint No. | 1 | a | b |
| P.870 | 93.90 | −1.16 | −3.27 |
| P.871 | 94.05 | −1.14 | −3.09 |
| P.872 | 94.12 | −1.12 | −3.16 |
| P.873 | 94.15 | −1.16 | −3.19 |
| P.874 | 94.10 | −1.17 | −3.24 |
| P.875 | 93.94 | −1.19 | −2.84 |
| P.876 | 94.16 | −1.15 | −3.09 |
| P.877 | 94.15 | −1.14 | −3.17 |
| P.878 | 94.31 | −1.14 | −3.29 |

It can be seen from the above results that paints containing the higher molecular weight acrylic polymer additives and no flow agent tended to produce films of good gloss and flow. As the molecular weight of the additive decreased, then the degree of cissing increased and the gloss diminished. All films containing flow agent were of excellent whiteness, gloss and flow showing no signs of cissing (potted appearance) and only extremely minor surface popping.

Hence films of good quality and whiteness can be made, cured with HAA and without the use of benzoin.

We claim:

1. A thermosetting powder coating composition comprising
   a) a solid saturated polyester having carboxylic acid groups, an acid value of at least 25 and a glass transition temperature (Tg) of at least 45° C.;
   b) a curing agent capable of reaction with the carboxylic acid groups of the solid saturated polyester (a), which curing agent is a hydroxy alkylamide; and
   c) as an antipopping agent, a thermoplastic polymer which
      i) is solid,
      ii) has a Tg of from 30° C. to 100° C. inclusive,
      iii) comprises units at least 80% of which are derived from at least one monomer selected from alkyl acrylate and alkyl alkacrylate and up to 20% of which are optionally derived from styrene, and
      iv) has an acid value of no more than 10, and
      v) is present in the said composition in an amount of from 2 to 6% by weight of the total weight of the composition.

2. A composition according to claim 1, wherein the respective amount of hydroxyalkyl amide curing agent (b) and solid saturated polyester (a) is such as to provide a hydroxy equivalent of the hydroxyalkyl amide (b) to a carboxyl equivalent of the polyester (a) of about 0.6:1 to 1.6:1.

3. A composition according to claim 1, wherein the thermoplastic polymer has an acid value of no more than.

4. A composition according to claim 1, wherein, in the thermoplastic polymer, the monomer from which the residues are derived is selected from a $C_{1-4}$ alkyl acrylate and a $C_{1-4}$ alkyl ($C_{1-2}$ alk) acrylate.

5. A composition according to claim 1, wherein the thermoplastic polymer is a copolymer having units derived from i) a monomer selected from an alkyl acrylate and an alkyl alkacrylate and ii) styrene.

6. A composition according to claim 1, wherein the thermoplastic polymer has a Tg of from 30° to 70° C. inclusive.

7. A composition according to claim 1, wherein the thermoplastic polymer has a number average molecular weight of 1,000 to 10,000.

8. A composition according to claim 1, wherein the thermoplastic polymer has a weight average molecular weight of 1,000 to 20,000.

9. A composition according to claim 1, wherein the thermoplastic polymer has a peak molecular weight of 500 to 1,000,000.

10. A composition according to claim 1, which additionally contains
    d) a flow control agent.

11. In a thermosetting powder coating composition containing a solid saturated polyester having carboxylic acid groups and curable by a hydroxyalkyl amide curing agent capable of reacting with the carboxylic acid groups, and additionally containing an antipopping agent, the improvement comprising the use, as the antipopping agent, of a thermoplastic polymer which
    i) is solid,
    ii) has a Tg of from 30° C. to 100° C. inclusive,
    iii) comprises residues derived from a monomer selected from an alkyl acrylate and an alkyl alkacrylate,
    iv) has an acid value of no more than 10, and
    v) is present in an amount of from 2 to 6% by weight of the total weight of the composition.

* * * * *

UNITED STATES PATENT AND TRADEMARK OFFICE
CERTIFICATE OF CORRECTION

PATENT NO. : 5,342,893
DATED : August 30, 1994
INVENTOR(S) : WILKINSON et al.

It is certified that error appears in the above-indentified patent and that said Letters Patent is hereby corrected as shown below:

Column 10, line 30, following "than" insert —5—.

Signed and Sealed this

Second Day of May, 1995

Attest:

BRUCE LEHMAN

Attesting Officer    Commissioner of Patents and Trademarks